(12) United States Patent
Berger et al.

(10) Patent No.: US 7,694,795 B2
(45) Date of Patent: Apr. 13, 2010

(54) DEVICE FOR ACTUATING A PARKING LOCK

(75) Inventors: Reinhard Berger, Buehl (DE); Carmen Ciemek, Buehl (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 654 days.

(21) Appl. No.: 11/605,574

(22) Filed: Nov. 29, 2006

(65) Prior Publication Data
US 2007/0125619 A1    Jun. 7, 2007

(30) Foreign Application Priority Data
Dec. 3, 2005   (DE) ....................... 10 2005 057 845

(51) Int. Cl.
*F16H 63/38*   (2006.01)
(52) U.S. Cl. .................................. 192/219.5; 192/219.4
(58) Field of Classification Search .............. 192/219.4, 192/220.6, 220.7, 219.5
See application file for complete search history.

(56) References Cited

U.S. PATENT DOCUMENTS

| | | | | |
|---|---|---|---|---|
| 6,125,983 A | * | 10/2000 | Reed et al. ................ | 192/219.5 |
| 2002/0024258 A1 | * | 2/2002 | Ehrmaier et al. ........... | 307/10.1 |
| 2002/0084162 A1 | * | 7/2002 | Schafer et al. ............ | 192/13 A |

FOREIGN PATENT DOCUMENTS

DE    102 59 893    7/2003
WO    WO 2004106780 A1 *   12/2004

* cited by examiner

*Primary Examiner*—Rodney H Bonck
(74) *Attorney, Agent, or Firm*—Simpson & Simpson, PLLC

(57) ABSTRACT

A device is provided for actuation of a parking lock of a vehicle transmission that is automatically operated in particular, whereby the parking lock can be brought into a locked position by means of a spring mechanism and can be brought out of the locked position and into an unlocked position by means of an actuator, and an electrically operated actuator is provided, acting upon a locking latch arranged in the unlocked position of the parking lock with a locking slide in an engaged position so that the engaged position can be released such that the spring mechanism brings the parking lock into the locked position.

9 Claims, 6 Drawing Sheets

DEVICE FOR ACTUATING A PARKING LOCK

CROSS REFERENCE TO RELATED APPLICATIONS

This patent application claims priority of German Patent Application No. 10 2005 057 845.4, filed Dec. 3, 2005, which application is incorporated herein by reference.

FIELD OF THE INVENTION

The present invention relates to a device for operating a parking lock of a motor vehicle transmission, in particular one that is automatic, whereby the parking lock can be brought into a locked position by means of a spring mechanism and can be brought out of the locked position and into an unlocked position by means of an actuator.

BACKGROUND OF THE INVENTION

In addition to automatic transmissions having a planetary design, other automatic vehicle transmissions are known, e.g., so-called automatic shift transmissions or, for example, double clutch transmissions. These transmissions are usually operated with an electrically operated actuator which performs the gear shifting operations triggered by a corresponding transmission controller. If a vehicle equipped with such a transmission is parked and the driver leaves the vehicle, a parking lock of the transmission is usually activated to block an output shaft and thus prevent the vehicle from rolling away.

To this end, such transmissions often have a park by wire function which ensures that the parking lock is activated via a switch operated by means of the selective lever, for example. Such a system is disclosed in German Patent DE 102 59 893 A1, for example, which discloses a device for operating a parking lock of an automatically operated transmission having a mechanical spring mechanism which activates the parking lock automatically by interrupting the power supply to a holding actuator which holds the parking lock in a deactivated, i.e., unlocked, state and, after the power supply to the holding magnet is interrupted, the parking lock is automatically activated, i.e., falls into the locked position. To this end, the interruption in power supply must be induced by the transmission controller so that, after a failure of the control pulse, triggering the transmission control accordingly, it may happen that the transmission controller does not interrupt the power supply to the holding magnet and thus the parking lock does not automatically engage.

Against this background, there is a long felt need for a device for operating a parking lock of a transmission, especially an automatic transmission, which will avoid these disadvantages.

SUMMARY OF THE INVENTION

According to this invention, a device is provided for operating a parking lock of a vehicle transmission, especially an automatic transmission, whereby the parking lock can be brought into a locked position by means of a spring mechanism and can be brought from the locked position into an unlocked position by means of an actuator, whereby an electrically operating actuator is provided, such that it acts upon a locking means arranged with a locking slide in an engagement position in the unlocked position of the locking means such as a locking latch for releasing the engaged position such that the spring mechanism brings the parking lock into the locked position. In contrast with the known parking lock described in the Background of the Invention, according to this invention, an electrically operated actuator is therefore provided, holding the parking lock in the unlocked position by holding a locking slide in an engaged position with a locking means such as a locking latch and for releasing the unlocked position, i.e., for engagement of the locked position of the parking lock, it must be acted upon by active current to release the engaged position between the locking means and the locking slide so that the spring mechanism can bring the parking lock into the locked position.

To release the engaged position between the locking means and the locking slide, according to this invention, a first actuator may also be provided for performing gear shift operations on the automatic transmission.

To increase the redundancy of the system, according to one refinement of the invention, the electrically operated actuator is a second actuator that is provided for actuation of the locking means and is also supplied with power by an electric energy source that is independent of the vehicle electric system and is triggered by a controller that is independent of the transmission controller. This achieves the result that, even in the event of a failure of the vehicle electric system and thus the transmission controller, the second actuator which is triggered by an independent energy source and by an independent controller can cancel the engagement position between the locking means and the locking slide and therefore the spring mechanism can bring the parking lock into the engagement, i.e., locked position.

According to the one embodiment of the present invention, a shift finger of the first actuator can be moved along a shift channel for acting upon the locking catch to release the engaged position. In this case, the shift channel may have an additional shift channel along which the shift finger can move so that it actuates the locking means for releasing the engaged position. To this end, the shift finger may act upon a spring-loaded release lever that acts upon the locking catch to release the engaged position so that the spring mechanism can bring the parking lock into the locked position.

The second actuator mentioned above may, according to this invention, be an electromagnet or a cam plate driven by an electric motor, for example, releasing the locking means out of the engaged position so that the spring mechanism brings the parking lock into the locked position. The electromagnet or the cam plate driven by an electric motor is therefore supplied with power by the independent electric power source which also supplies power to the independent controller mentioned above.

The parking lock is thus not activated automatically according to the present invention, but instead a control pulse of the independent controller mentioned above, for example, is required. Therefore, in the event of failure of the transmission controller or an operating element in the form of the selector lever mentioned above, the parking lock is not automatically engaged, but instead is engaged only when the driver of the vehicle removes the ignition key, for example, or removes a key card which is necessary for operating the vehicle. This may be used as a control pulse for the second actuator mentioned above, which is triggered by the independent controller and ensures that the engaged position between the locking means and the locking slide is cancelled and thus the spring mechanism brings the parking lock into the locked position.

The general object of the invention is to provide a device for operating a parking lock of a transmission, especially an automatic transmission, which avoids the disadvantages described in the Background of the Invention.

BRIEF DESCRIPTION OF THE DRAWINGS

The invention will now be described in greater detail below with reference to the drawings, in which.

DETAILED DESCRIPTION OF THE INVENTION

Figure 1:
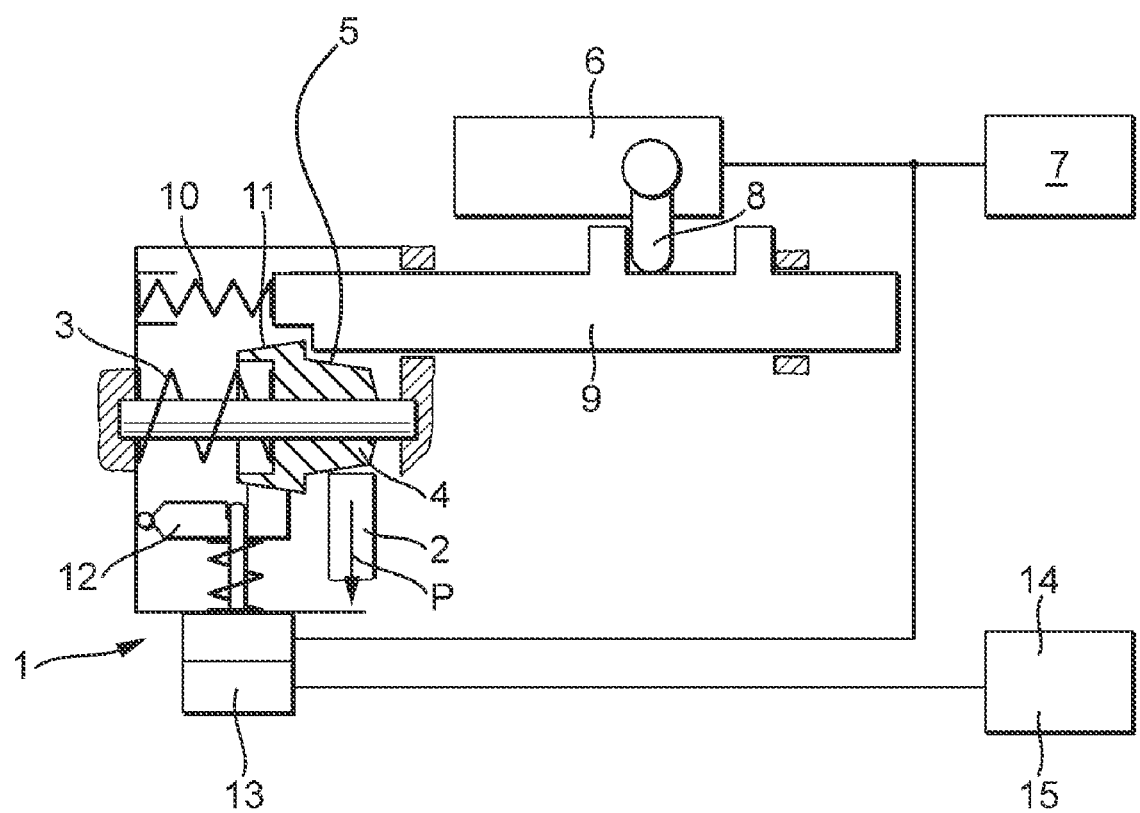
FIG. 1 is a schematic diagram of an embodiment of an inventive device.

FIG. 1 shows a schematic diagram of an embodiment of device 1 for operating a parking lock according to the present invention, whereby FIG. 1 corresponds to the locked position of the parking lock.

To bring the parking lock into this locked position, parking lock latch 2 is brought into an engaged position with a locking wheel (not shown in detail here), which is arranged on a transmission output shaft, for example.

Locking slide 4 is brought into contact with the parking locking means along conical surface 5 via a spring mechanism in the form of spring 3, as illustrated here in the embodiment of parking lock latch 2, for example, so that parking lock latch 2 is shifted in the direction of arrow P and thus engages with the locking wheel (not shown).

By means of first actuator 6 which is triggered by transmission controller 7, shift finger 8 which acts on shift rail 9 and can displace shift rail 9 against the action of compression spring 10 can be operated.

Locking slide 4 is situated so that it engages along second conical face 11 with a locking means such as that shown here in the embodiment of locking latch 12 which can be operated by second actuator 13 that is triggered by means of controller 14 which is independent of transmission controller 7 and can also have electric power source 15 independent of the vehicle electric system.

Figure 2:
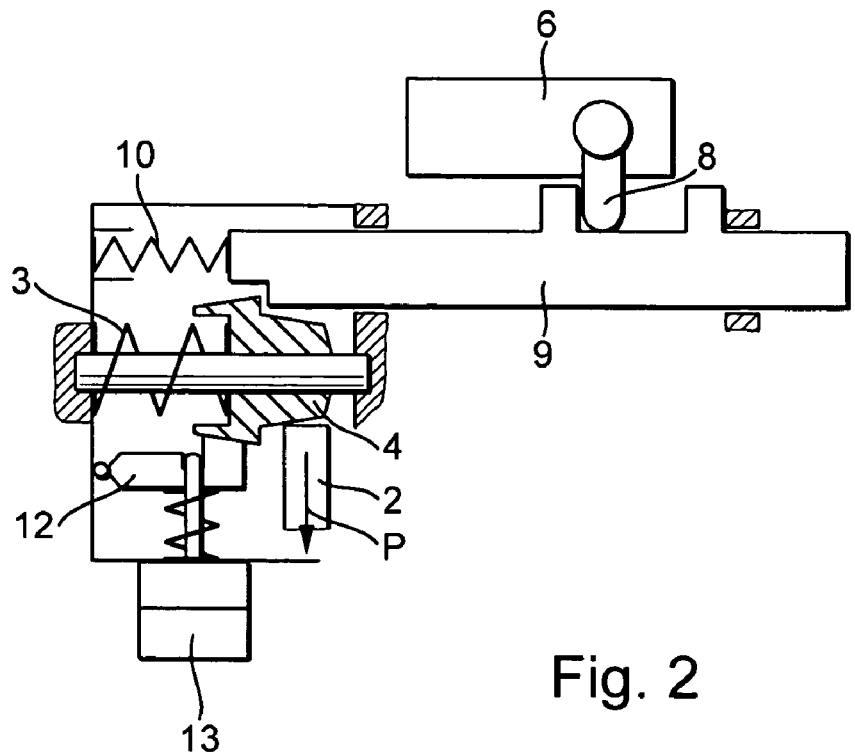
FIG. 2 is a detailed view from FIG. 1 to illustrate an engaged, i.e., locked parking lock.
Figure 3:
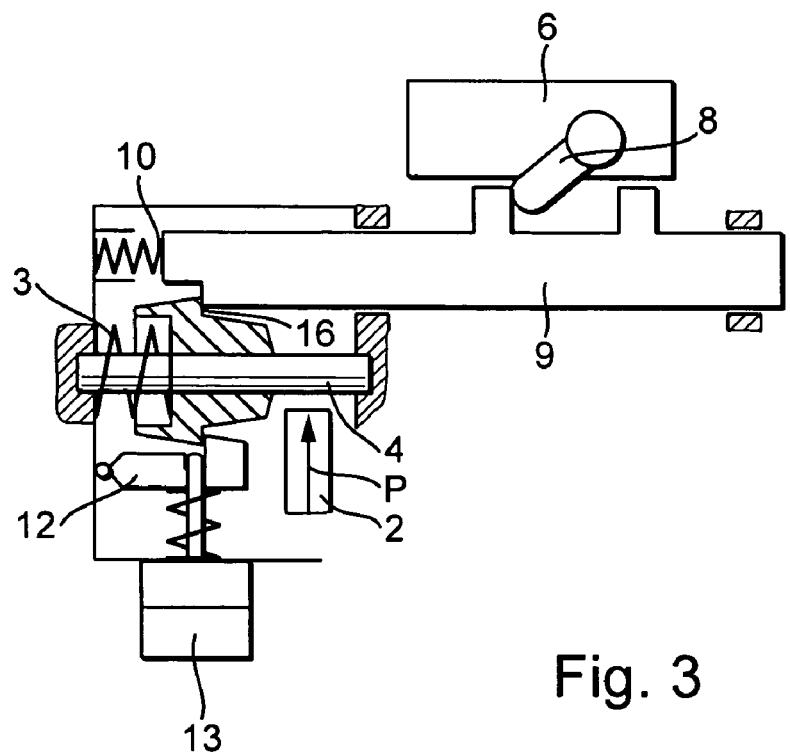
FIG. 3 is a diagram which illustrates the design of the parking lock.

FIGS. 2 and 3 illustrate the process of disengaging the parking lock, i.e., when the parking lock is converted from the locked position which is illustrated in FIG. 2, into the unlocked position illustrated in FIG. 3.

First actuator 6 actuates shift finger 8 for unlocking parking lock latch 2 and in this way presses shift rail 9 toward the left in the plane of the drawing against the action of compression spring 10 so that shift rail 9 comes in contact with locking slide 4 and releases it from engagement with parking lock latch 2 against the action of spring 3. Parking lock latch 2 migrates upwardly in the plane of the drawing, releasing the locking wheel (not shown in detail here) so the parking lock is disengaged. In the unlocked position, locking latch 12 engages undercut face 16 of locking slide 4 and keeps it out of the engaged position with parking lock latch 2 against the action of spring 3.

Figure 4:
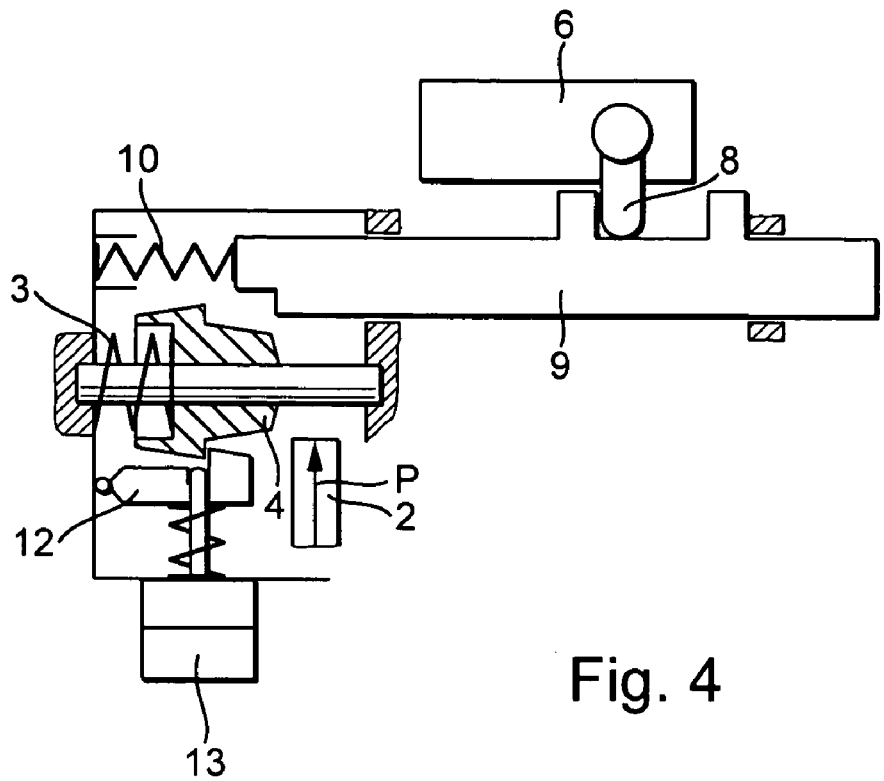
FIG. 4 is a diagram similar to that of FIG. 3 with a shift rail which is in the starting position and a disengaged, i.e., unlocked, parking lock.

This position is also illustrated in FIG. 4, where FIG. 4 differs from FIG. 3 in that compression spring 10 has pressed shift rail 9 back into the starting position after shift finger 8 has been moved back into the starting position via first actuator 6. In this position, first actuator 6 can also shift gears in the transmission (not shown in detail here).

Figure 5:
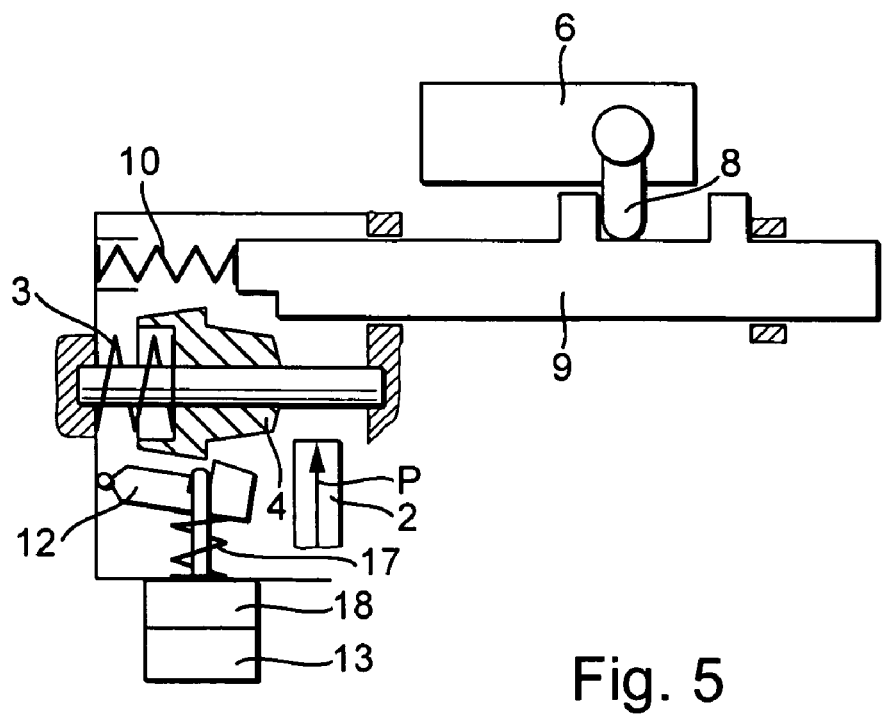
FIGS. 5 and 6 are diagrams that illustrate engagement of the parking lock.

If the parking lock should now be transferred from the unlocked position into the locked position, second actuator 13 receives electric power via controller 14 and pulls locking latch 12 out of engagement with locking slide 4 against the action of spring 17, and the locking slide subsequently is pressed by spring 3 in the direction to the right in the plane of the drawing and its conical face 5 comes to be engaged with parking lock latch 2. FIG. 5 also shows another actuator 18 which is triggered accordingly by transmission controller 7 (see FIG. 1) and can be used, for example, as a main actuator for actuation of locking latch 12 against the action of spring 17 but is not necessary and instead in one embodiment of the device, if desired, second actuator 13 may be provided only as an emergency actuator for locking latch 12.

Figure 6:
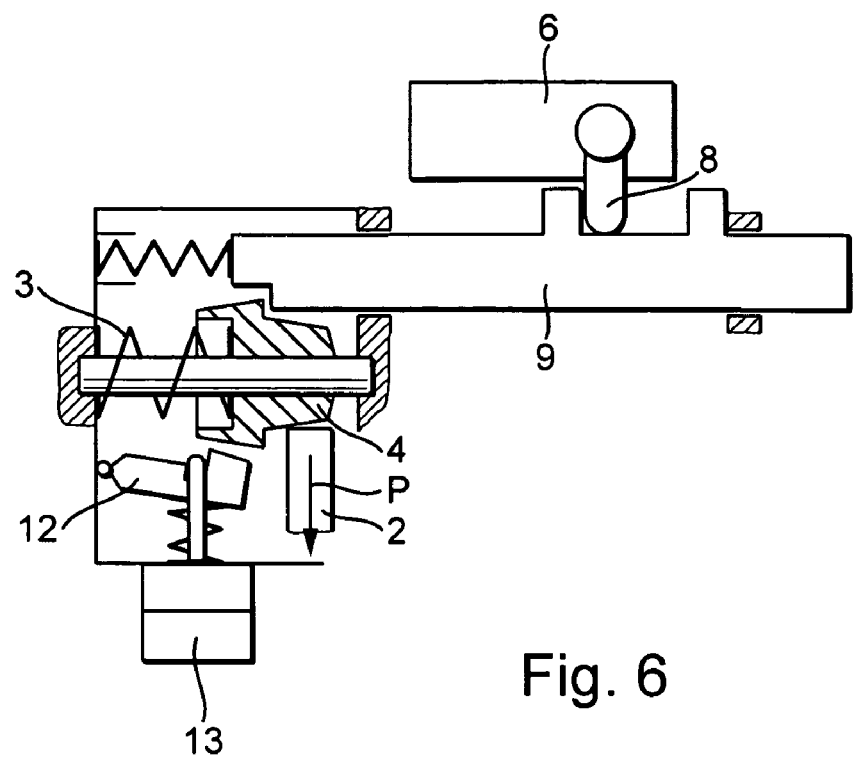

FIG. 6 illustrates the position in which locking slide 4 has already come in contact with parking lock latch 2 on conical face 5 and thus has locked the locking wheel (not shown). Conical face 5 may be designed to be self-inhibiting so that parking lock latch 2 cannot press locking slide 4 automatically back into the position illustrated in FIG. 4.

Figure 7:
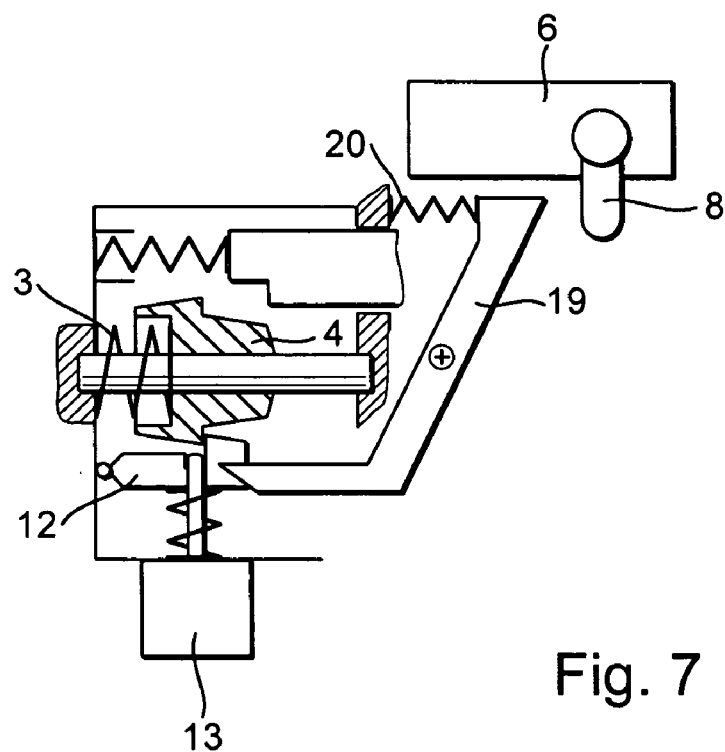
FIGS. 7 and 8 are diagrams that illustrate engagement of the parking lock by means of a transmission actuator; and, FIGS. 9 and 10 are diagrams that illustrate the engagement of the parking lock by means of a second actuator in the form of a cam plate.
Figure 8:
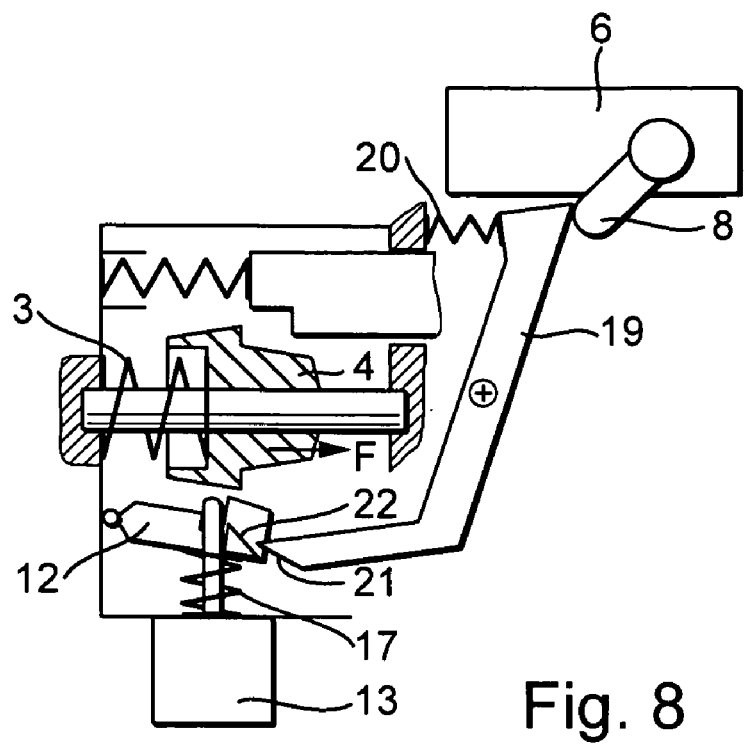

FIGS. 7 and 8 show schematic diagrams of an alternative embodiment according to the present invention whereby first actuator 6 can operate release lever 19 with its shift finger 8 against the action of spring 20. FIG. 7 shows the disengaged position of the parking lock (to simplify the diagram, parking lock latch 2 has been omitted) and release lever 19 is acted upon by spring 20 such that with inclined face 21 it comes in contact with inclined face 22 of locking latch 12 and locking latch 12 holds locking slide 4 in the position in which it is forced to the right in the plane of the drawing against the action of spring 3.

If parking lock latch 2 should now be engaged with the locking wheel, shift finger 8 is actuated by first actuator 6 in such a way that it presses on release lever 19 so that inclined face 21 presses against inclined face 22 of locking latch 12 and presses it in the direction downwardly against the action of spring 17, so that locking latch 12 is released from the engaged position with locking slide 4, and the locking slide is pressed in the direction to the right in the plane of the drawing due to the action of spring 3 in the direction of arrow F so that conical face 5 comes to be engaged with parking lock latch 2 and this locks the locking wheel. In the event of a loss of function of transmission actuator 6 due to a defect in the vehicle electric system, for example, locking latch 12 can be pulled via second actuator 13 out of the engaged position with locking slide 4 against the action of spring 17 and in this way locking slide 4 can be pressed by spring 3 in the direction of arrow F (FIG. 8) so that parking lock latch 2 locks the locking wheel.

Figure 9:
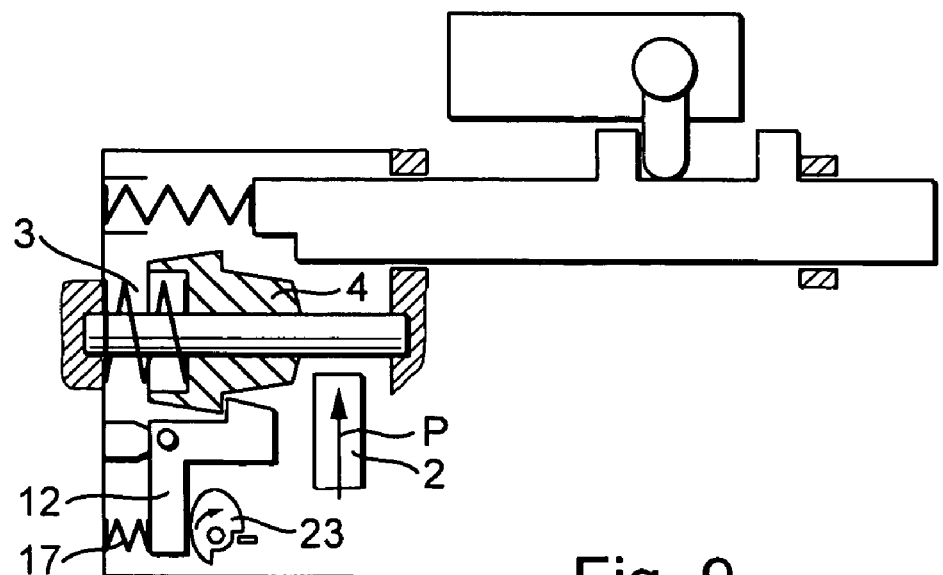
Figure 10:
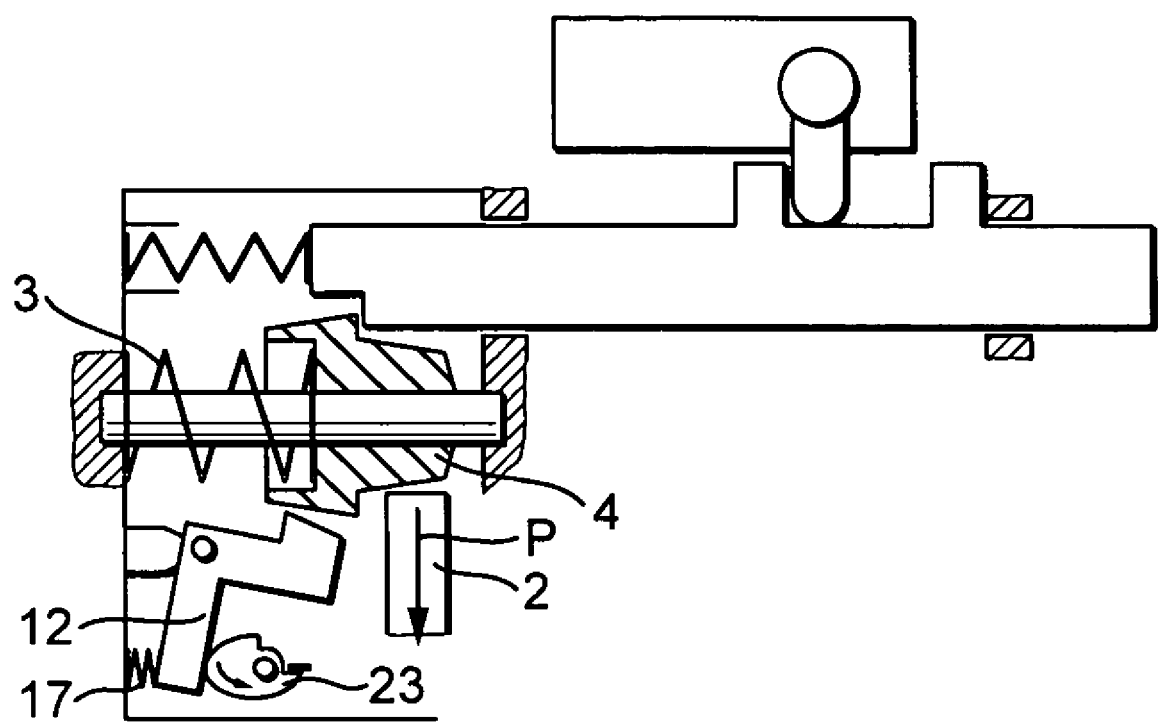

FIGS. 9 and 10 also show an embodiment having cam plate 23 for activation of locking latch 12. FIG. 9 shows the unlocked position of the parking lock where parking lock latch 2 is not in contact with locking slide 4 and locking latch 12 is in the engaged position with locking slide 4. If the parking lock is to be engaged now, i.e., parking lock latch 2 is to be transferred from the unlocked position illustrated in FIG. 9 to the locked position illustrated in FIG. 10, then cam plate 23 is rotated by the second actuator (not shown in detail in FIGS. 9 and 10) and ensures that locking latch 12 is released from the engaged position with locking slide 4 so that locking slide 4 is pushed to the right by spring 3 and conical face 5 of locking slide 4 comes to be engaged with parking lock latch 2 and thus locks the parking lock.

Thus the parking lock can be brought from the unlocked position into the locked position only by actuation and thus active power supply from the first or second actuator. If there is disturbance in transmission controller 7 due to a vehicle electric system failure, for example, so that first actuator 6 and any additional actuator 18 can no longer be triggered accordingly, then independent controller 14 with independent power source 15 ensures that second actuator 13 can be triggered so that the parking lock can be securely engaged.

With regard to the features of the present invention that are not explained in detail above, reference is made to the claims and the drawings.

LIST OF REFERENCE NUMERALS

1 Device
2 Parking lock latch
3 Spring, spring mechanism
4 Locking slide
5 Conical face
6 First actuator
7 Transmission controller
8 Shift finger
9 Shift rail
10 Compression spring
11 Conical face
12 Locking latch
13 Actuator
14 Controller
15 Power source
16 Face
17 Spring
18 Actuator
19 Release lever
20 Spring
21 Inclined face
22 Inclined face
23 Cam plate

What is claimed is:

1. A device for actuating a parking lock of a vehicle transmission that is operated automatically, comprising:
   a parking lock latch (2);
   a locking slide (4);
   a spring mechanism (3) engaged with locking slide (4) for urging locking slide (4) to contact parking lock latch (2) to engage and displace parking lock latch (2) so that parking lock latch (2) contacts a locking wheel of the transmission to lock the locking wheel;
   a first electrically operated actuator (6) for urging locking slide (4) out of engagement with parking lock latch (2);
   a locking means (12);
   a spring (17) for urging locking means (12) to contact locking slide (4) so that locking means (12) is in a locked position with locking slide (4) when locking slide (4) is out of engagement with parking lock latch (2); and,
   a second electrically operated actuator (13) or release lever (19) for urging locking means (12) out of engagement with locking slide (4) to release locking slide (4) out of the locked position with locking means (12).

2. The device recited in claim 1 wherein actuator (6) is provided for performing gear shift operations.

3. The device recited in claim 2 wherein a shift finger (8) of first actuator (6) can be moved along a shift channel for acting upon locking means (12) for releasing the engaged position.

4. The device recited in claim 2 wherein a shift finger (8) acts upon spring-loaded release lever (19) that in turn acts upon locking means (12) for releasing the engaged position.

5. The device recited in claim 1 wherein second actuator (13) is supplied with power by an electric power source (15) that is independent of a vehicle electric system and second actuator (13) is triggered by a controller (14) that is independent of a transmission controller (7).

6. The device recited in claim 5 wherein first actuator (6) is operatively arranged to be activated for releasing the engaged position by removing an authorization required for operation of the vehicle.

7. The device recited in claim 5 wherein second actuator (13) is operatively arranged to be activated for releasing the engaged position by removing an authorization required for operation of the vehicle.

8. The device recited in claim 1 wherein second actuator (13) is an electromagnet operatively arranged to release the locking means (12) from the engaged position.

9. The device recited in claim 1 wherein second actuator (13) is a cam plate (23) driven by an electric motor operatively arranged to release locking means (12) from the engaged position.

* * * * *